United States Patent
Specht

(10) Patent No.: US 10,543,621 B2
(45) Date of Patent: Jan. 28, 2020

(54) ACTIVE AND PASSIVE SELF-EVACUATION OF A SELF-PRIMING WATER PUMP

(71) Applicant: Hilti Aktiengesellschaft, Schaan (LI)

(72) Inventor: Helmut Specht, Bad Woerishofen (DE)

(73) Assignee: Hilti Aktiengesellschaft, Schaan (LI)

( * ) Notice: Subject to any disclaimer, the term of this patent is extended or adjusted under 35 U.S.C. 154(b) by 108 days.

(21) Appl. No.: 15/518,676

(22) PCT Filed: Oct. 15, 2015

(86) PCT No.: PCT/EP2015/073831
§ 371 (c)(1),
(2) Date: Apr. 12, 2017

(87) PCT Pub. No.: WO2016/059133
PCT Pub. Date: Apr. 21, 2016

(65) Prior Publication Data
US 2017/0232639 A1    Aug. 17, 2017

(30) Foreign Application Priority Data
Oct. 15, 2014 (EP) .................................. 14188944

(51) Int. Cl.
*B28D 7/02* (2006.01)
*B23Q 11/10* (2006.01)
(Continued)

(52) U.S. Cl.
CPC ............ *B28D 7/02* (2013.01); *B23Q 11/1092* (2013.01); *F04D 13/16* (2013.01); *F04D 15/0016* (2013.01); *F16K 31/0603* (2013.01)

(58) Field of Classification Search
CPC ....... B28D 7/02; F16K 31/0603; F04D 13/16; F04D 15/0077; F04D 15/0016; B23Q 11/1092; Y10T 137/86815
(Continued)

(56) References Cited

U.S. PATENT DOCUMENTS 4,255,079 A * 3/1981 Piegza ...................... F04D 9/02
                                                  415/11
4,718,128 A * 1/1988 Fan .......................... E03C 1/04
                                                  137/597
(Continued)

FOREIGN PATENT DOCUMENTS

CA          2140721      7/1996
CN        103807159      5/2014
(Continued)

OTHER PUBLICATIONS

U.S. Appl. No. 65/089,944, filed Jan. 21, 2003, Bratten et al.

*Primary Examiner* — Charles G Freay
(74) *Attorney, Agent, or Firm* — Davidson, Davidson & Kappel, LLC

(57) ABSTRACT

A water supply apparatus for the supply of water to a machine tool, including a water pump, a water accumulator device, a suction line, a supply line and a valve device reversibly adjustable into a first and a second position. The water pump is positioned downstream of the valve device. A first connecting line, a second connecting line and a return line are provided. Here, in the first position, the first connecting line, the second connecting line and the return line are connected to one another such that water can be conveyed from the water pump, from the first connecting line, from the second connecting line, from at least a part of the suction line and from at least a part of the supply line into the return line, and, in the second position, the first connecting line, the second connecting line and the return line are not connected to one another.

9 Claims, 9 Drawing Sheets

(51) Int. Cl.
*F04D 15/00* (2006.01)
*F04D 13/16* (2006.01)
*F16K 31/06* (2006.01)

(58) Field of Classification Search
USPC ..... 417/28, 199.2, 278, 434, 435; 137/625.4
See application file for complete search history.

(56) References Cited

U.S. PATENT DOCUMENTS

| | | | | |
|---|---|---|---|---|
| 4,850,828 | A * | 7/1989 | Yonezawa | F04B 1/02 |
| | | | | 417/252 |
| 4,966,191 | A * | 10/1990 | Azizi | F16K 11/078 |
| | | | | 137/625.17 |
| 5,020,324 | A * | 6/1991 | MacDonald | F04B 49/007 |
| | | | | 417/252 |
| 5,868,550 | A * | 2/1999 | Howchin | F04D 9/006 |
| | | | | 415/1 |
| 2010/0031435 | A1 | 2/2010 | Lemire et al. | |
| 2011/0180493 | A1 | 7/2011 | Holzmeier et al. | |

FOREIGN PATENT DOCUMENTS

| | | |
|---|---|---|
| DE | 1073311 | 1/1960 |
| GB | 1220342 | 1/1971 |
| JP | 2010167511 A | 8/2010 |
| JP | 2011126005 | 6/2011 |

\* cited by examiner

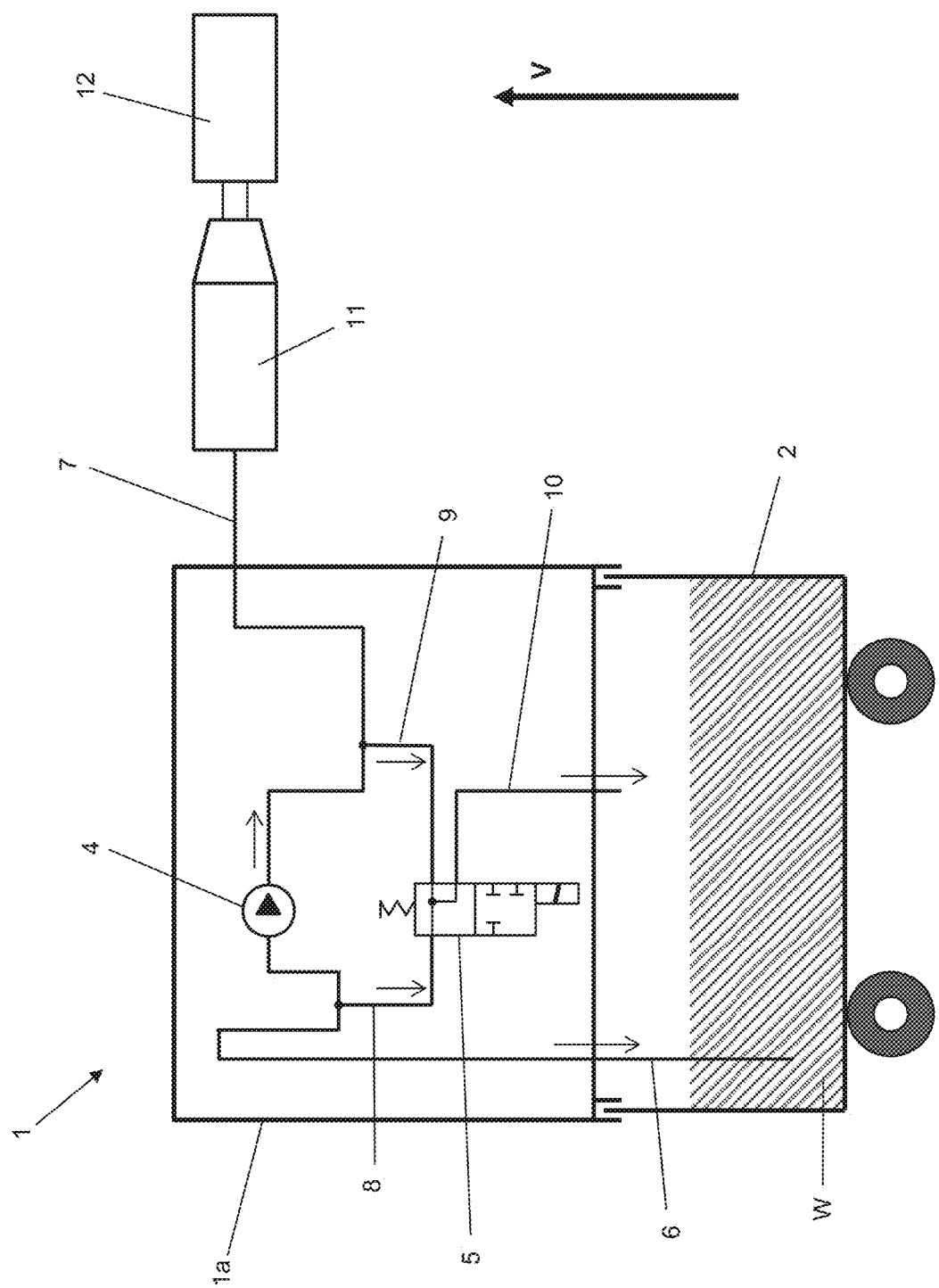

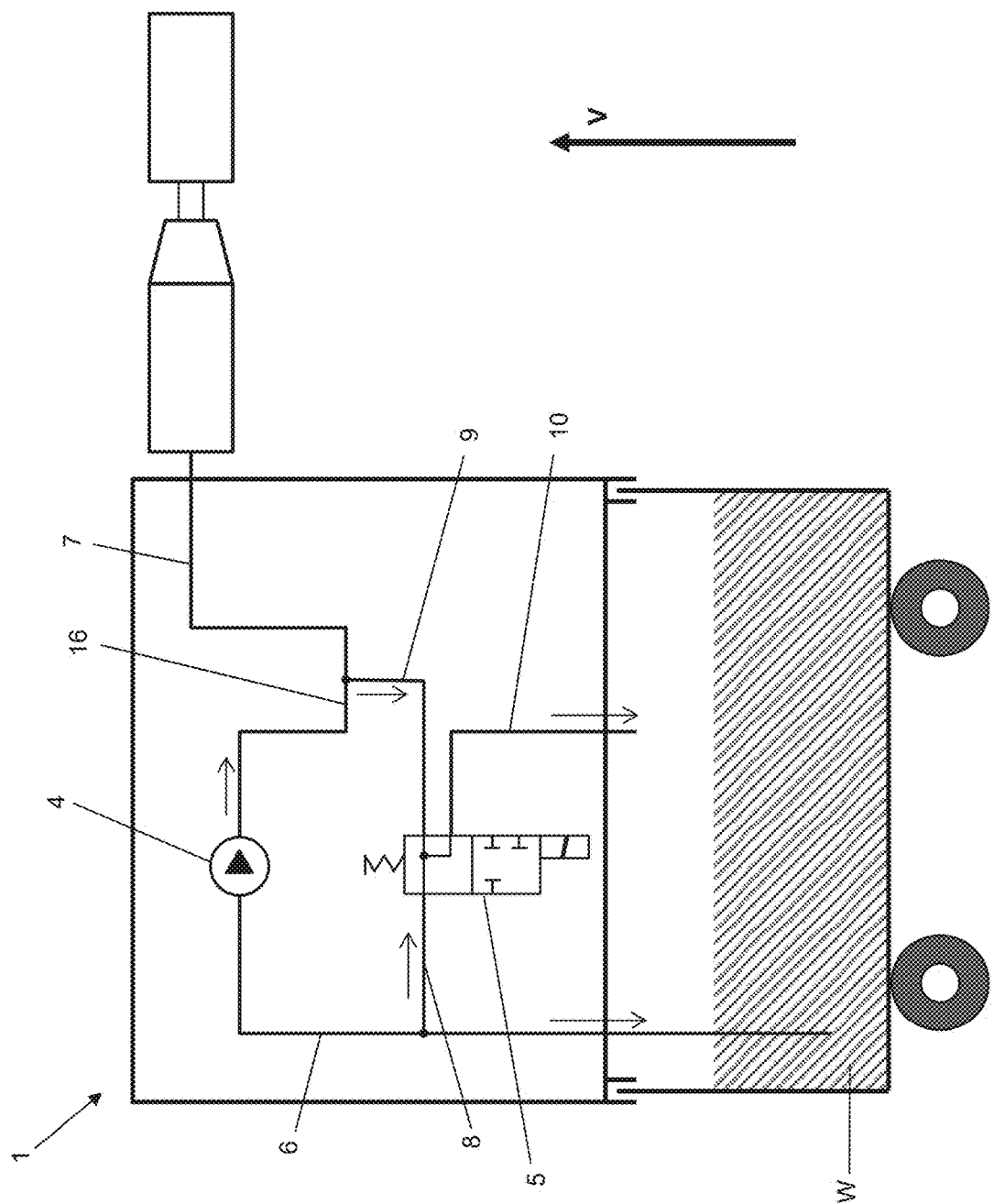

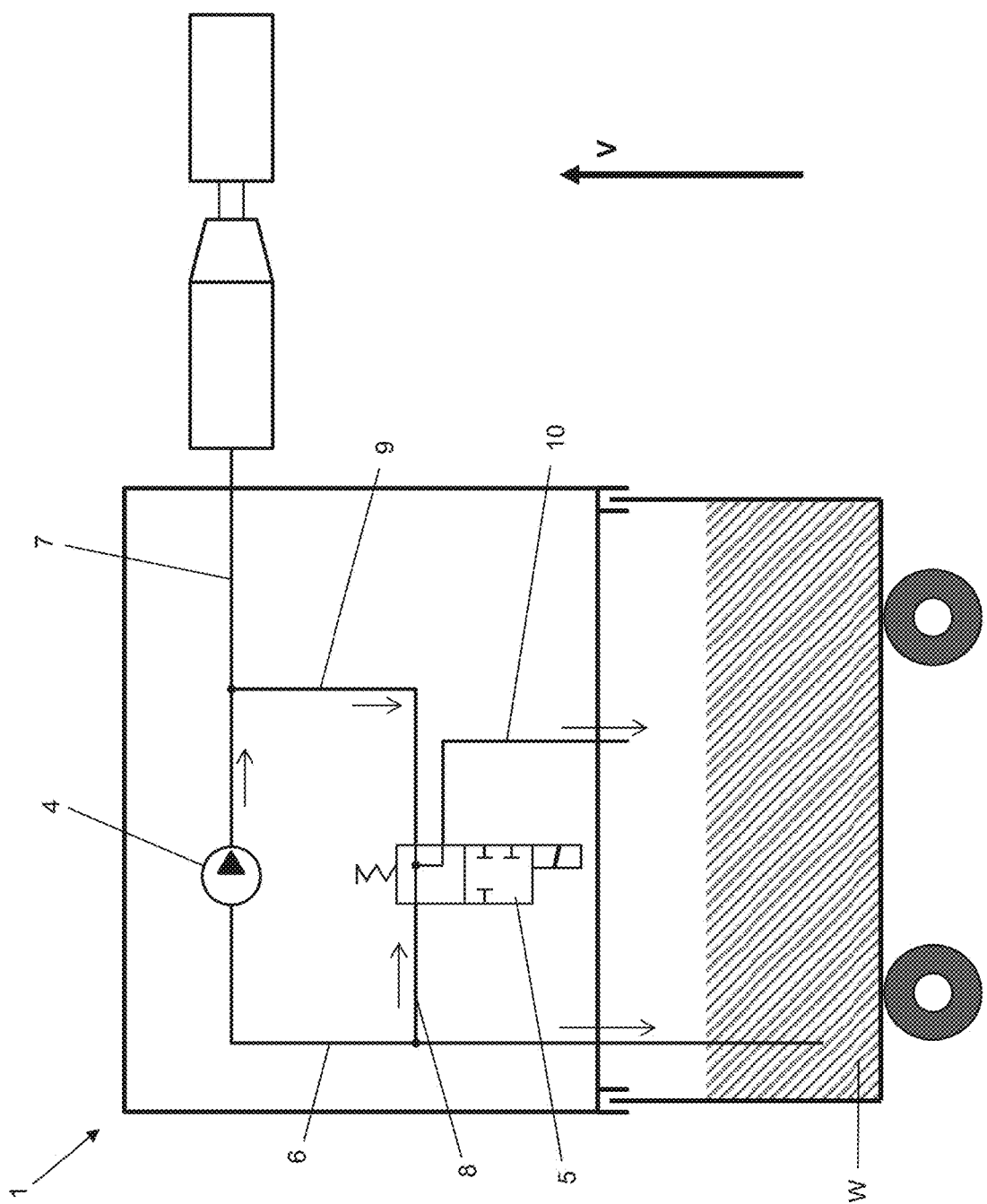

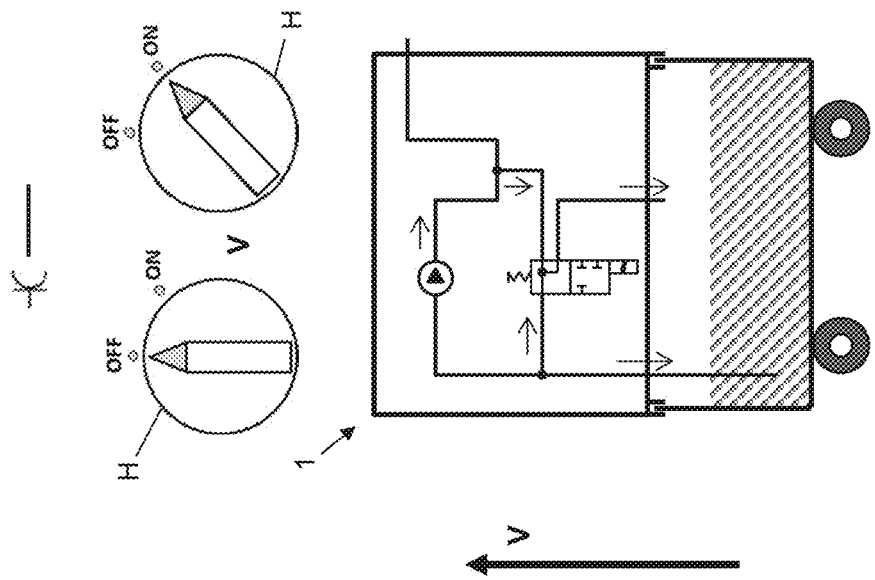
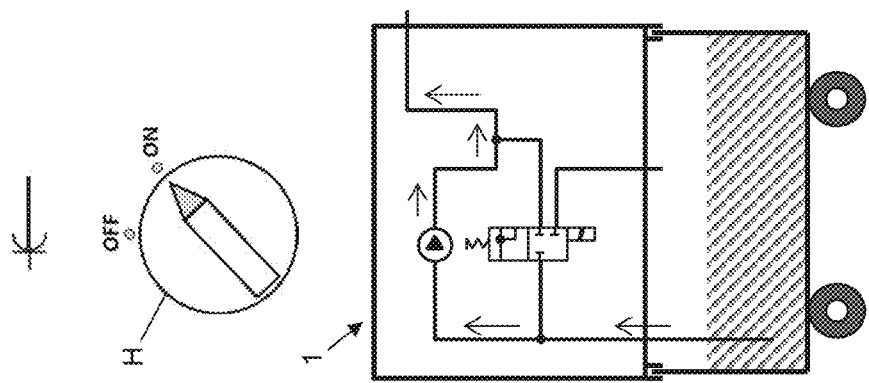
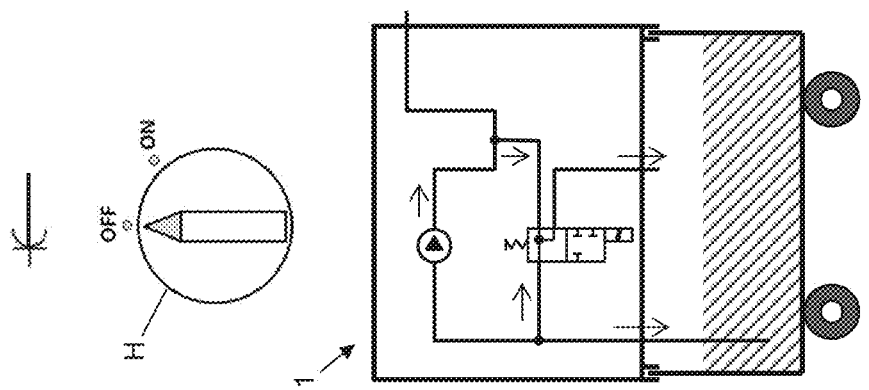

ACTIVE AND PASSIVE SELF-EVACUATION OF A SELF-PRIMING WATER PUMP

The present invention relates to a water supply device for supplying a power tool with water, including a water pump, a storage device for storing water, a suction line for conducting water from the storage device to the water pump, a supply line for conducting water from the water pump to the power tool and a valve device, which is reversibly adjustable at least into a first position and a second position.

BACKGROUND

Water supply devices are used to sufficiently supply a power tool with water. A power tool of this type is usually a core drill or a diamond wall saw. Core drills and diamond wall saws are usually used to cut or saw through a mineral material, such as masonry or stone. In power tools of this type, a sufficient supply of water during operation is indispensable, due to the generated heat and dust. The water is used to cool the power tool and the tool element driven by the power tool (for example a core bit or a saw blade). In addition, the supplied water is used to rinse abraded material in the form of dust and/or chunks of stone out of or off the tool element. Without corresponding cooling or rinsing of the power tool and the tool element, these components would very quickly become damaged.

Water supply devices are known from the prior art, which include a water container for receiving water and which conduct this water to a connected power tool via a line system with the aid of an integrated pump for the purpose of cooling and/or rinsing the power tool and its components.

The integrated pumps are frequently designed in the form of submersible pumps or self-priming pumps.

The use of a water supply device of this type poses a serious problem at ambient temperatures below the freezing point of the particular liquid to be pumped (0° C. for water). If a user fails to properly evacuate the water from the water supply device after finishing using the water supply device, damage may occur to the water supply device due to the freezing of the remaining water or due to the formation of ice. In particular, the water pump may be damaged hereby. Not only the formation of ice directly in the water pump must be avoided but also the pumping of chunks of ice which have already formed in the water of the water container.

A proper evacuation of the water supply device and, in particular, the water pump after the use thereof is, however, often a laborious and time-consuming enterprise, and it is therefore neglected by the user for reasons of convenience and/or lack of time.

SUMMARY OF THE INVENTION

It is an object of the present invention to solve the aforementioned problem and, in particular, to provide a water supply device for supplying a power tool with water, including a water pump, a storage device for storing water, a suction line for conducting water from the storage device to the water pump, a supply line for conducting water from the water pump to the power tool and a valve device, which is reversibly adjustable at least into a first position and a second position, with the aid of which an easy and automatic self-evacuation of the water supply device as well as the water pump is possible, and a damage to the water pump due to freezing water or ice is thus prevented.

A water supply device is provided for supplying a power tool with water, including a water pump, a storage device for storing water, a suction line for conducting water from the storage device to the water pump, a supply line for conducting water from the water pump to the power tool and a valve device, which is reversibly adjustable at least into a first position and a second position.

According to the present invention, the water pump is positioned in a direction downstream from the valve device, and a first connecting line is provided for conducting water from the suction line to the valve device, a second connecting line is provided for conducting water from the supply line to the valve device and a return line is provided for conducting water from the valve device to the water reservoir, in the first position, the first connecting line, the second connecting line and the return line being connected to each other in such a way that water is conveyable from the water pump, from the first connecting line, from the second connecting line, from at least one part of the suction line and from at least one part of the supply line to the return line, and in the second position, the first connecting line, the second connecting line and the return line being not connected to each other. An evacuation of the water supply device as well as the water pump may be effectively facilitated hereby, and damage to the water pump due to freezing water or ice may consequently be prevented.

According to another advantageous specific embodiment, the valve device may be designed as a self-resetting 3/2-way valve. A reversible connection and disconnection of the first connecting line, the second connecting line and the return line to/from each other may be efficiently carried out thereby.

To permit an automatic operation of the self-resetting 3/2-way valve independently of a first electrical energy source, it may be possible according to another advantageous specific embodiment for the self-resetting 3/2-way valve to be movable from the second position into the first position with the aid of at least one spring element.

To permit an automatic operation of the self-resetting 3/2-way valve independently of a first electrical energy source, it may be possible, according to another advantageous specific embodiment, for the self-resetting 3/2-way valve to be movable from the second position into the first position by at least one electrical actuation means including an electromagnetic coil.

According to another advantageous specific embodiment, the valve device may switch from the second position into the first position when the valve device or the water supply device is disconnected from a first energy source, the first energy source being designed in the form of a mains supply or at least one storage battery. An automatic evacuation of the water pump as well as the lines may be ensured hereby if the water supply device is intentionally or unintentionally disconnected from the energy source.

To always ensure an active self-evacuation of the water pump, a second energy source may be provided to supply the water pump with electrical energy when the water pump is disconnected from the first energy source.

According to another advantageous specific embodiment it may be provided that the valve device switches from the second position into the first position when the water supply device is placed into a deactivation mode. This may ensure that a self-evacuation of the water pump as well of the lines is carried out when the water supply device is turned off, i.e., when it is in deactivation mode.

A valve device is furthermore provided according to at least one of the specific embodiments described above for use in a water supply device.

Moreover, a method for controlling a water supply device according to at least one of the specific embodiments described above is provided, including the steps:
- adjusting the water supply device from an activation mode into a deactivation mode;
- adjusting a water pump from an activation mode into a deactivation mode;
- adjusting a valve device from the second position into the first position;
- adjusting the water pump from the deactivation mode into the activation mode after a first predetermined time period has elapsed; and
- adjusting the water pump from an activation mode into a deactivation mode after a second predetermined time period has elapsed.

An active self-evacuation of the water pump after the water supply device has been turned off (deactivation mode of the water supply device) may be ensured hereby.

Further advantages result from the following description of the figures. The figures illustrate different exemplary embodiments of the present invention. The figures and the description contain numerous features in combination. Those skilled in the art will advantageously also consider the features individually and combine them to form other reasonable combinations.

BRIEF DESCRIPTION OF THE DRAWINGS

In the figures, identical and equivalent components are provided with identical reference numerals.

FIG. 1a shows a schematic view of a water supply device according to the present invention according to a first specific embodiment, including a power tool and a valve device in a first position;

FIG. 3 shows a schematic view of the water supply device according to a third specific embodiment, connected to a power tool;

FIG. 4 shows a schematic view of the water supply deice according to a fourth specific embodiment, connected to a power tool;

FIG. 6a shows a schematic view of the water supply device according to the present invention according to the third specific embodiment, in which the valve device is in the first position and connected to the first electrical energy source, and in which the power switch of the water supply device is in the off position (deactivation mode);

FIG. 6b shows a schematic view of the water supply device according to the present invention according to the third specific embodiment, in which the valve device is in the second position and connected to the first electrical energy source, and in which the power switch of the water supply device is in the on position (activation mode);

FIG. 6c shows a schematic view of the water supply device according to the third specific embodiment, in which the valve device is in the first position and disconnected from the first electrical energy source, and in which the power switch of the water supply device is in the off position (deactivation mode) or in the on position (activation mode);

DETAILED DESCRIPTION

Figure 1B:
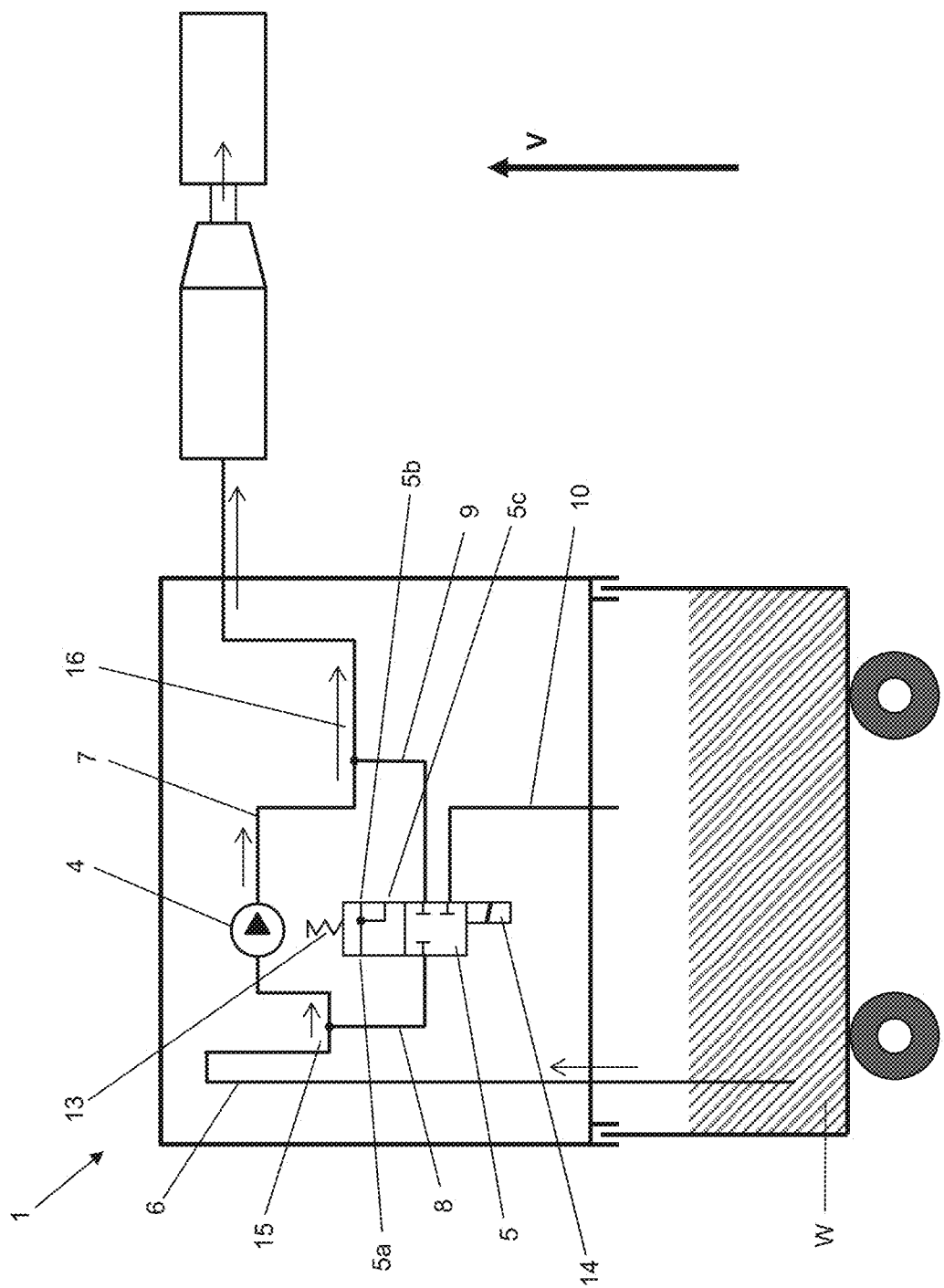
FIG. 1b shows a schematic view of the water supply device according to the present invention according to the first specific embodiment, including a power tool and a valve device in a second position.

FIG. 1 shows a schematic view of a water supply device 1 according to the present invention according to a first specific embodiment.

Water supply device 1 includes a device head 1a and a storage device 3 for storing water W. Storage device 2 for storing water W may also be referred to as a water reservoir.

Device head 2 essentially includes a water pump 4, a valve device 5, a suction line 6, and supply line 7, a first connecting line 8, a second connecting line 9 and a return line 10.

Water pump 4 is designed in the form of a self-priming pump and is connected to suction line 6 as well as supply line 7. Suction line 6 extends from water reservoir 2 to water pump 4. Supply line 7 extends from water pump 4 to a power tool 11 and a tool element 12. Water W may be pumped through suction line 6 from water reservoir 2 to water pump 4. Water may be pumped through supply line 7 from water pump 4 to a power tool 11 and a tool element 12 connected to power tool 11. In FIGS. 1, 2, 3 and 4, power tool 11 is illustrated as a core drill and tool 12 as a core bit. Neither power tool 11 nor tool element 12 is illustrated in FIGS. 5a through 6c.

Valve device 5 is designed as a self-resetting 3/2-way solenoid valve and includes a spring element 13 as well as an electrical actuating means 14, which includes an electromagnetic coil 15. Self-resetting 3/2-way solenoid valve 5 has three ports 5a, 5b, 5c and two switching positions. First connecting line 8 extends from suction line 6 to valve device 5, and second connecting line 9 extends from supply line 7 to valve device 5. Return line 10 extends from valve device 5 to water reservoir 2. According to the first specific embodiment of water supply device 1, first connecting line 8 is connected to suction line 6 at a point where suction line 6 forms a trough 15 (cf. FIGS. 1a, 1b). Accordingly, second connecting line 9 is connected to supply line 7 at a point where supply line 7 forms a trough 16 (cf. FIGS. 1a, 1b). Particular trough 15, 16 is formed by a lowest point in suction line 6 or in supply line 7 counter to direction V.

Figure 5B:
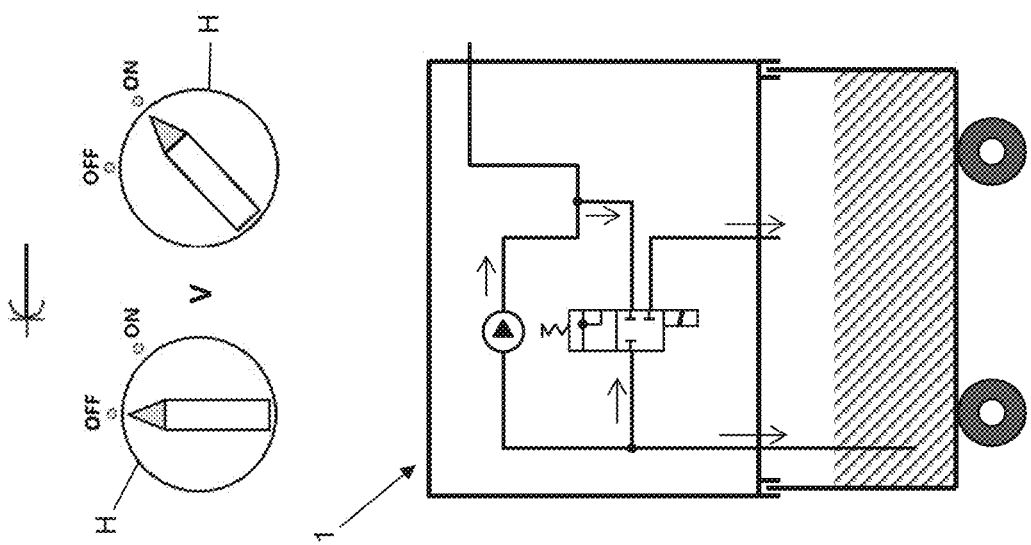
FIG. 5b shows a schematic view of the water supply device according to the present invention according to the third specific embodiment, in which the valve device is in a second position and connected to the first electrical energy source, and in which the power switch of the water supply device is in the off position (deactivation mode) or in the on position (activation mode)

Valve device 5 may be reversibly adjusted into a first position and into a second position. In FIGS. 1a, 2, 3 and 4, valve device 5 designed as a 3/2-way solenoid valve is adjusted in the first position. In FIGS. 1b, 5b and 6b, valve device 5 designed as a 3/2-way solenoid valve is adjusted in the second position.

In the first position, first connecting line 8 and second connecting line 9 are connected to return line 10 in such a way that water present in first or second connecting line 8, 9 may flow into return line 10 and enter water reservoir 2 via the return line. For this purpose, valve device 5 includes an internal line system, with the aid of which first and second connecting lines 8, 9 are connected to return line 10. The valve device is held in the first position with the aid of spring element 13.

In the second position, first connecting line 8 and second connecting line 9 are not connected to return line 10, so that no water is able to enter return line 10 from first or second connecting line 8, 9. Valve device 5 is moved from the first position into the second position with the aid of electrical actuating means 14, i.e., valve device 5 is moved by electrical actuating means 14 in direction V. Electrical actuating means 14 is designed in such a way that it requires a voltage to permit valve device 5 to be brought from the first position into the second position. If no voltage of this type is present at electrical actuating means 14, valve device 5 is not able to be brought from the first position into the second position. The valve device remains in the second position as long as a voltage is present at electrical actuating means 14. Without a voltage, the valve device is returned to the first position by spring element 13.

The first position is thus an initial or idle position of valve device 5.

As illustrated in FIGS. 1*a* through 7, water pump 4 is positioned at a higher point in water supply device 1 than valve device 5. This means that water pump 4 is positioned downstream from valve device 5 in direction V. As a result, the water may flow out of water pump 4 into valve device 5 via connecting lines 8, 9 with the aid of gravity, when water pump 4 is not pumping the water.

Figure 2:
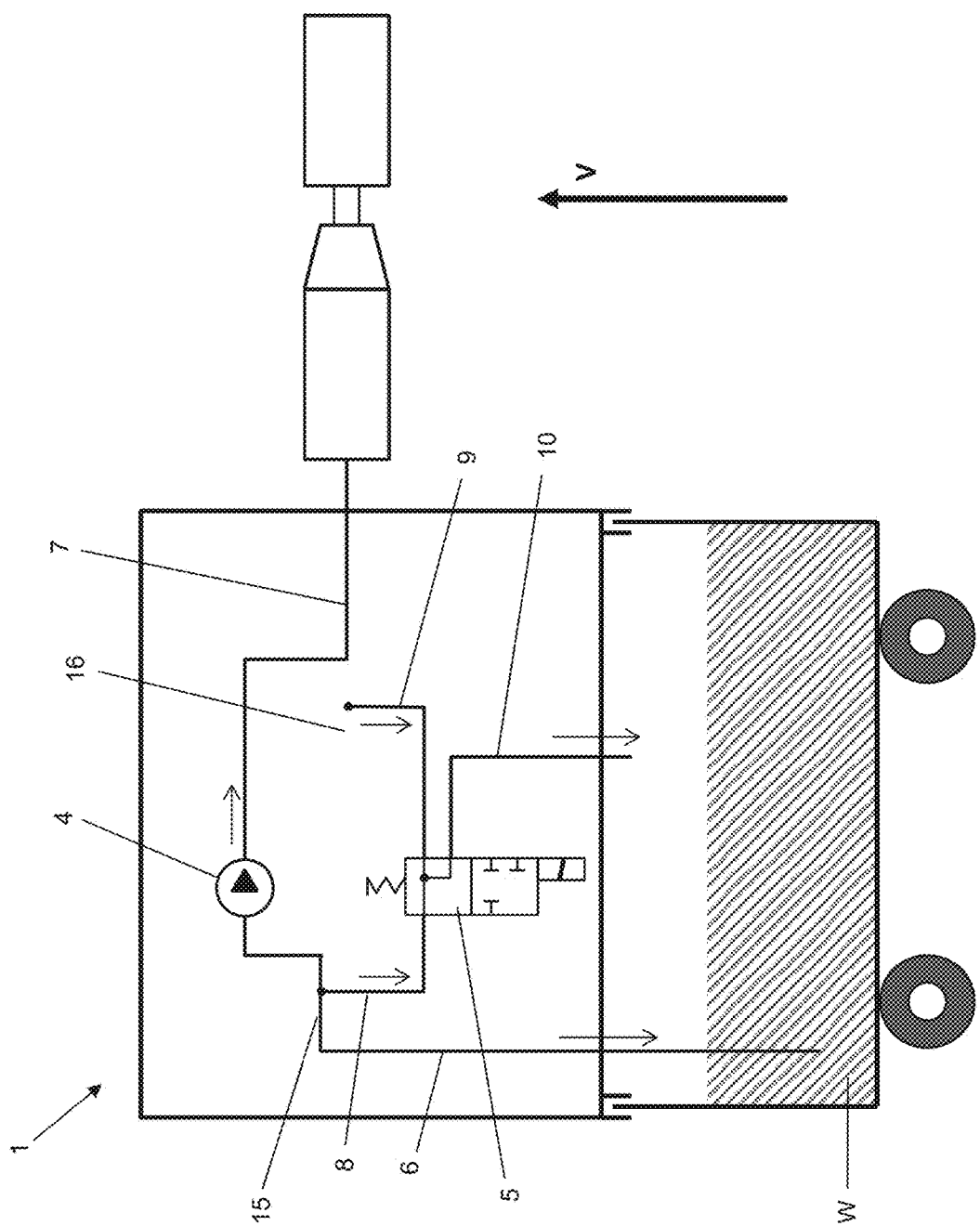
FIG. 2 shows a schematic view of the water supply deice according to a second specific embodiment, connected to a power tool.

As is shown accordingly in particular FIGS. 2 through 4, suction line 6 and/or supply line 7 may also be designed without troughs 15, 16 and be connected to first and second connecting lines 8, 9. However, first connecting line 8 is always connected to suction line 6 in such a way that a certain slope exists in first connecting line 8 toward valve device 5. Accordingly, second connecting line 9 is always connected to supply line 7 in such a way that a certain slope exists in second connecting line 9 toward valve device 5. Due to the slope, water may enter valve device 5 and finally return line 10 from first and second connecting lines 8, 9 with the aid of gravity.

Figure 5A:
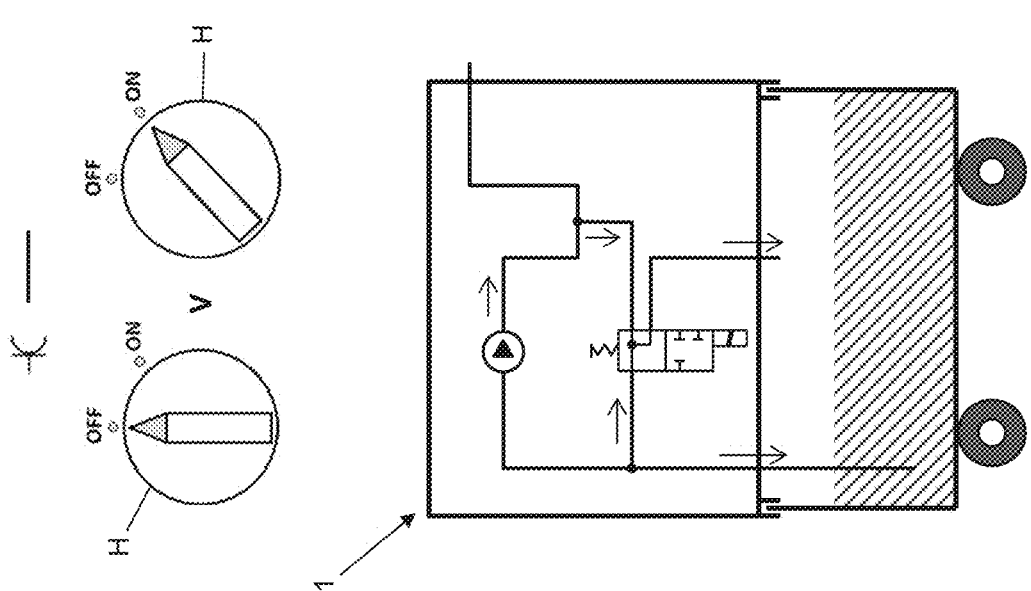
FIG. 5a shows a schematic view of the water supply device according to the third specific embodiment, in which a valve device is in a first position and disconnected from a first electrical energy source, and in which a power switch of the water supply device is in an off position (deactivation mode) or in an on position (activation mode)

In FIGS. 5*a* and 5*b*, water supply device 1 is illustrated without power tool 11. Water supply device 1 includes a first energy source, which supplies water supply device 1 with electric current and which is designed in the form of a mains power cable and/or in the form of at least one accumulator. The first energy source is not shown in the figures.

Moreover, water supply device 1 includes an actuating device, with the aid of which the individual functions of water supply device 1 may be controlled. In addition, water supply device 1 is reversibly adjustable from a deactivation mode into an activation mode with the aid of the actuating device. In deactivation mode, water supply device 1 is turned off and inoperable, although the water supply device continues to be supplied with electric current. In activation mode, the water supply device is turned on and operable, water supply device 1 being supplied with electric current. The actuating device essentially includes a main switch H. Main switch H may be optionally placed in an "off position" or in an "on position." In the off position of main switch H, water supply device 1 is in deactivation mode. In the on position of main switch H, water supply device 1 is in activation mode. The actuating device is not illustrated in the figures. Only main switch H of the actuating device is shown stylistically in FIGS. 5*a* through 8.

A first variant of the sequence of the purely passive self-evacuation of water pump 4 in water supply device 1 according to the present invention is illustrated in FIGS. 5*a* and 5*b*. FIG. 5*a* shows water supply device 1 in a state in which water supply device 1 is disconnected from the first energy source, and main switch H is in the "off position" or in the "on position." The "V" between the two representations of the main switch means "or" and refers to the fact that the main switch is placed in either the "off position" or the "on position" in the corresponding figure. In this state (i.e., water supply device 1 is disconnected from the first energy source, and main switch H is in the "off position" or in the "on position"), valve device 5 is in the first position, i.e., first connecting line 8 and second connecting line 9 are connected to return line 10, so that water present in first or second connecting line 8, 9 may flow into return line 10 for the purpose of entering water reservoir 2 via return line 10. In other words, if water supply device 1 was disconnected from the first energy source, the valve device switches to the first position so that water pump 4 is able to evacuate itself. This is independent of the position (off or on) of main switch H.

FIG. 5*b* shows water supply device 1 in a state in which water supply device 1 is connected to the first energy source, and main switch H is in the "off position" or in the "on position." In this state, valve device 5 is in the second position in which first connecting line 8 and second connecting line 9 are not connected to return line 10, so that no water is able to enter return line 10 from first or second connecting line 8, 9. In other words, if water supply device 1 is connected to the first energy source, valve device 5 is in the second position, so that water pump 4 may pump water from water reservoir 2 to power tool 11 through suction line 6 and supply line 7. This is independent of the position (off or on) of main switch H.

According to the first variant of the sequence of the purely passive self-evacuation of water pump 4, a passive or automatic self-evacuation of water pump 4 is carried out only if water supply device 1 is disconnected from the first energy source.

A second variant of the sequence of the purely passive self-evacuation of water pump 4 in water supply device 1 according to the present invention is illustrated in FIGS. 6*a*, 6*b* and 6*c*.

FIG. 6*a* shows water supply device 1 in a state in which water supply device 1 is connected to the first energy source, and main switch H is in the "off position." In this state, valve device 5 is in the first position, i.e., first connecting line 8 and second connecting line 9 are connected to return line 10 so that water present in first or second connecting line 8, 9 may flow into return line 10 for the purpose of entering water reservoir 2 via return line 10. In other words, if water supply device 1 is connected to the first energy source, and main switch H is in the off position, valve device 5 is in the first position so that water pump 4 is able to evacuate itself.

FIG. 6*b* shows water supply device 1 in a state in which water supply device 1 is connected to the first energy source, and main switch H is in the "on position." In this state, valve device 5 is in the second position in which first connecting line 8 and second connecting line 9 are not connected to return line 10, so that no water is able to enter return line 10 from first or second connecting line 8, 9. In other words, if water supply device 1 is connected [to] the first energy source, and main switch H is in the on position, valve device 5 is in the second position, so that water pump 4 may pump water from water reservoir 2 to power tool 11 through suction line 6 and supply line 7.

FIG. 6c shows water supply device 1 in a state in which water supply device 1 is disconnected from the first energy source, and main switch H is in the "off position" or in the "on position." In this state, valve device 5 is in the first position, i.e., first connecting line 8 and second connecting line 9 are connected to return line 10 so that water present in first or second connecting line 8, 9 may flow into return line 10 for the purpose of entering water reservoir 2 via return line 10. In other words, if water supply device 1 is disconnected from the first energy source, valve device 5 switches to the first position so that water pump 4 is able to evacuate itself. This is independent of the position (off or on) of main switch H.

According to the second variant of the sequence of the purely passive self-evacuation of water pump 4, a passive or automatic self-evacuation of water pump 4 is carried out only if water supply device 1 is disconnected from the first energy source or main switch H is in the off position.

Figure 7:
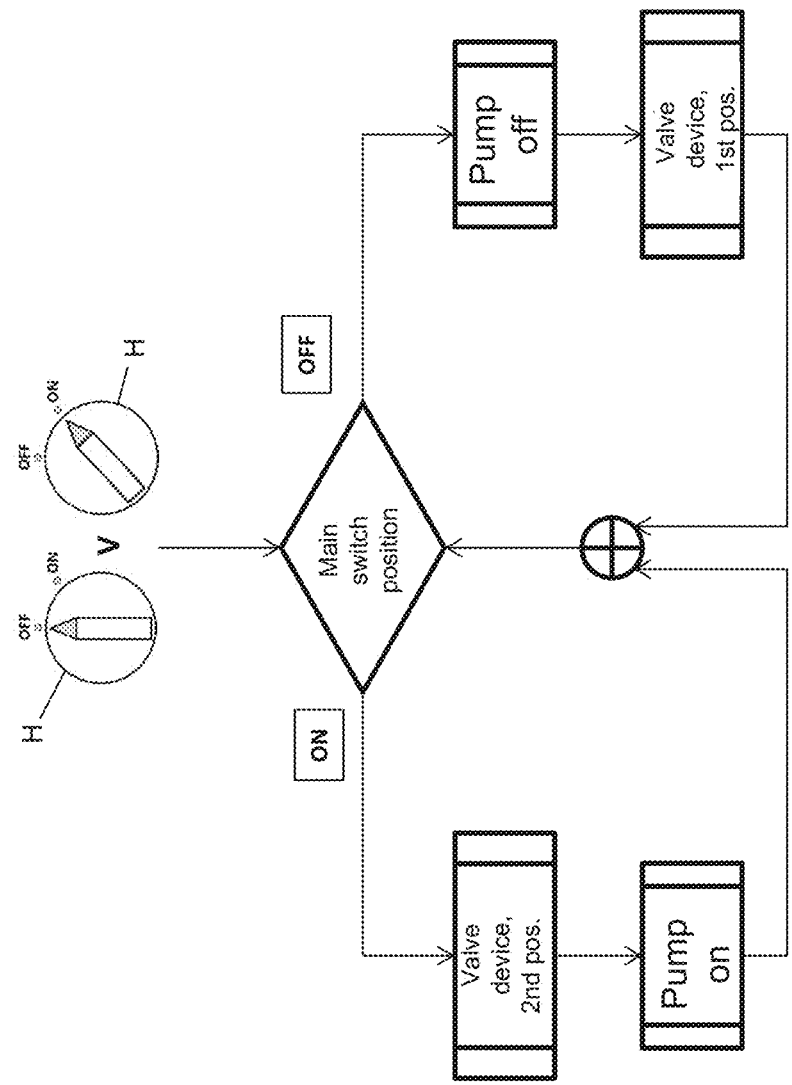
FIG. 7 shows a first flow chart with regard to a method according to the present invention.

FIG. 7 shows a flow chart of the second variant of the sequence of the passive self-evacuation of water pump 4.

Figure 8:
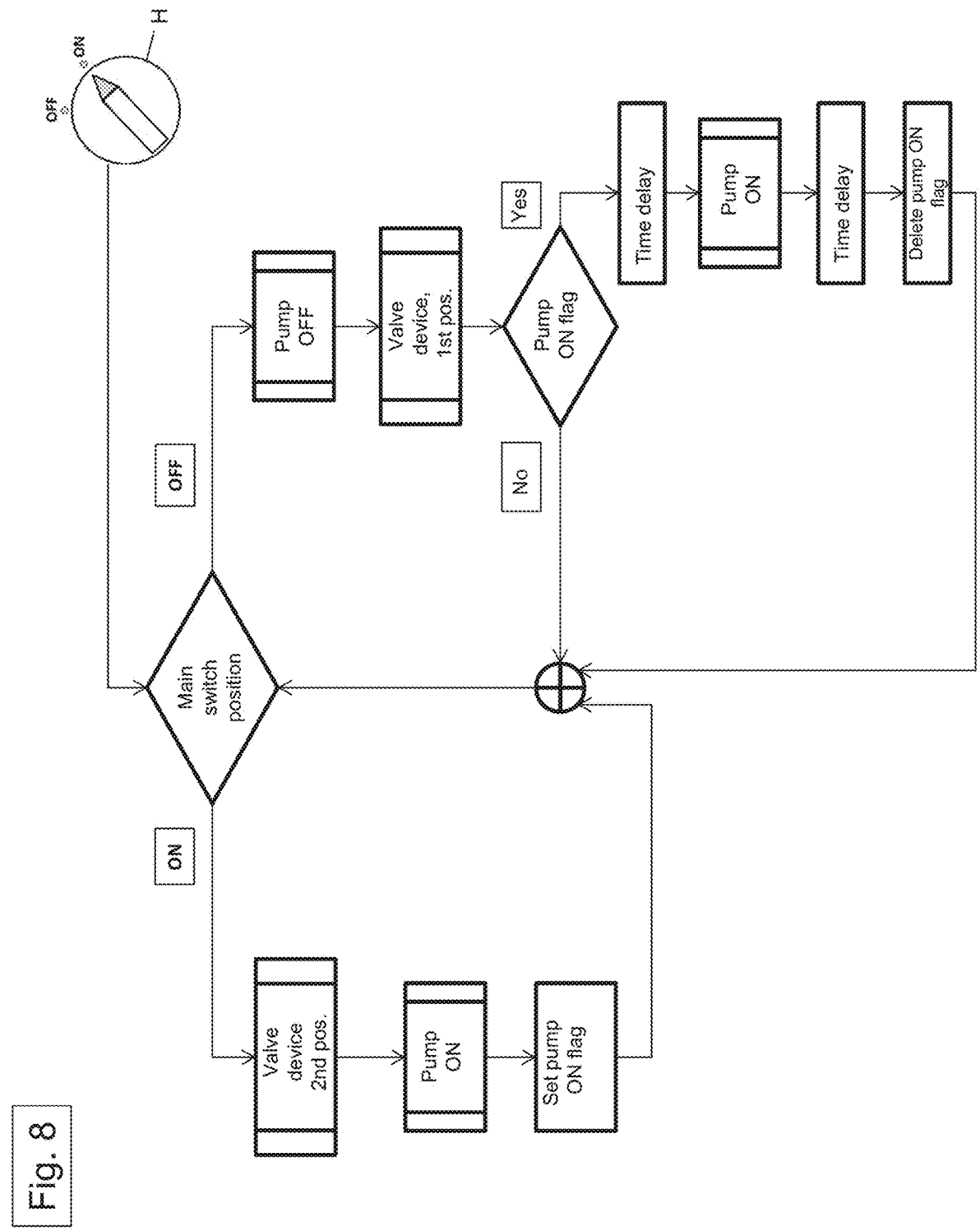
FIG. 8 shows a second flow chart with regard to a method according to the present invention.

A third variant of the sequence of the purely passive self-evacuation of water pump 4 in water supply device 1 according to the present invention is illustrated in FIG. 8.

With regard to the position (off or on) of main switch H and the connection or disconnection of the first energy source, the third variant is identical to the second variant (cf. FIGS. 6a, 6b and 6c). The sequence in FIG. 8 is similar to the sequence in FIG. 7.

In the sequence in FIG. 8, main switch H is initially switched into the on position, whereby valve device 5 switches to the second position and water pump 4 is activated (turned on). A "water pump ON" flag is then set.

If main switch H is switched to the off position, valve device 5 switches to the first position and water pump 4 is deactivated (turned off). A passive self-evacuation of water pump 4 takes place, as described above. An inquiry is subsequently made as to whether a "water pump ON" flag is present.

If the presence of a "water pump ON" flag is detected, a time delay takes place to facilitate a passive self-evacuation of water pump 4. Water pump 4 is then reactivated (turned on) for a defined time period, whereby water pump 4 empties itself. Air is aspirated by water pump 4, and the water still present is pumped out of water pump 4. The "water pump ON" flag is then deleted.

According to a fourth variant of the sequence of the purely passive self-evacuation of water pump 4 in water supply device 1 according to the present invention, an additional, i.e. second, energy source s provided for supplying water pump 4 with voltage. The second energy source is designed in the form of an accumulator. Alternatively, the second energy source may also be designed in the form of a battery and/or capacitor. The second energy source is not illustrated in the figures.

With the aid of the second energy source, water pump 4 is supplied with energy separately, so that water pump 4 remains activated even if water supply device 1 is disconnected from the first energy source. It may be ensured hereby that, when valve device 5 switches to the first position, which is induced by disconnecting water supply device 1 from the first energy source (as described above), water pump 4 is able to self-evacuate.

What is claimed is:

1. A water supply device for supplying a power tool with water, the water supply device comprising:
    a water pump;
    a storage device for storing water;
    a suction line for conducting water from the storage device to the water pump;
    a supply line for conducting water from the water pump to the power tool;
    a valve device reversibly adjustable into a first position and into a second position, the water pump being positioned at a higher point than the valve device;
    a first connecting line for conducting water from the suction line to the valve device;
    a second connecting line for conducting water from the supply line to the valve device; and
    a return line for conducting water from the valve device to the water reservoir;
    in the first position the first connecting line, the second connecting line and the return line being connected so that water is conveyable from the water pump, from the first connecting line, from the second connecting line, from at least one part of the suction line and from at least one part of the supply line into the return line, and, in the second position, the first connecting line, the second connecting line and the return line are not connected to each other; wherein the valve device is designed as a self-resetting 3/2-way valve.

2. The water supply device as recited in claim 1 wherein the 3/2-way valve is movable from the second position into the first position by at least one spring element.

3. The water supply device as recited in claim 1 wherein the 3/2-way valve is movable from the second position into the first position by at least one electrical actuation means including an electromagnetic coil.

4. The water supply device as recited in claim 1 wherein the valve device switches from the second position into the first position when the valve device or the water supply device is disconnected from a first energy source, the first energy source being designed in the form of a mains supply or at least one storage battery.

5. The water supply device as recited in claim 4 further comprising a second energy source to supply the water pump with electrical energy when the water pump is disconnected from the first energy source.

6. The water supply device as recited in claim 1 wherein the valve device switches from the second position into the first position when the water supply device is placed into a deactivation mode.

7. A method for using the water supply device as recited in claim 1 comprising: switching the valve device between the first and second positions.

8. A method for controlling the water supply device as recited in claim 1, comprising the following steps:
    adjusting the water supply device from an activation mode where the water supply device is on into a deactivation mode where the water supply device is off;
    adjusting the water pump from a pump activation mode into a pump deactivation mode;
    adjusting the valve device from the second position into the first position;
    adjusting the water pump from the pump deactivation mode into the pump activation mode after a first predetermined time period has elapsed; and
    adjusting the water pump from the pump activation mode into the pump deactivation mode after a second predetermined time period has elapsed.

9. A method for controlling a water supply device for supplying a power tool with water, the water supply device including a water pump; a storage device for storing water;

a suction line for conducting water from the storage device to the water pump; a supply line for conducting water from the water pump to the power tool; a valve device reversibly adjustable into a first position and into a second position, the water pump being positioned at a higher point than the valve device; a first connecting line for conducting water from the suction line to the valve device; a second connecting line for conducting water from the supply line to the valve device; and a return line for conducting water from the valve device to the water reservoir; in the first position the first connecting line, the second connecting line and the return line being connected so that water is conveyable from the water pump, from the first connecting line, from the second connecting line, from at least one part of the suction line and from at least one part of the supply line into the return line, and, in the second position, the first connecting line, the second connecting line and the return line are not connected to each other, the method comprising the following steps:

adjusting the water supply device from an activation mode where the water supply device is on into a deactivation mode where the water supply device is off;

adjusting the water pump from a pump activation mode into a pump deactivation mode;

adjusting the valve device from the second position into the first position;

adjusting the water pump from the pump deactivation mode into the pump activation mode after a first predetermined time period has elapsed; and adjusting the water pump from the pump activation mode into the pump deactivation mode after a second predetermined time period has elapsed.

* * * * *